United States Patent
Stinson

(10) Patent No.: US 9,664,793 B2
(45) Date of Patent: May 30, 2017

(54) SYSTEM FOR GPS LOCATION, IMPACT, AND TEMPERATURE RECORDER FOR A TRANSPORTING CONTAINER

(71) Applicant: Byron Gene Stinson, Glen Rose, TX (US)

(72) Inventor: Byron Gene Stinson, Glen Rose, TX (US)

( * ) Notice: Subject to any disclaimer, the term of this patent is extended or adjusted under 35 U.S.C. 154(b) by 449 days.

(21) Appl. No.: 14/547,758

(22) Filed: Nov. 19, 2014

(65) Prior Publication Data
US 2015/0192679 A1    Jul. 9, 2015

Related U.S. Application Data

(60) Provisional application No. 61/924,826, filed on Jan. 8, 2014.

(51) Int. Cl.
| | |
|---|---|
| *G01S 19/13* | (2010.01) |
| *G01S 19/14* | (2010.01) |
| *G01S 5/00* | (2006.01) |

(52) U.S. Cl.
CPC .......... *G01S 19/14* (2013.01); *G01S 5/0027* (2013.01)

(58) Field of Classification Search
USPC .................................................. 342/357.51
See application file for complete search history.

(56) References Cited

U.S. PATENT DOCUMENTS

| | | | | |
|---|---|---|---|---|
| 7,193,512 | B1 * | 3/2007 | Coulthard | G06Q 50/22 340/531 |
| 9,292,694 | B1 * | 3/2016 | Valceanu | G06F 21/577 |
| 2003/0078905 | A1 * | 4/2003 | Haugli | G08B 13/19602 |
| 2004/0226309 | A1 * | 11/2004 | Broussard | F25D 11/003 62/236 |

FOREIGN PATENT DOCUMENTS

CN        203366097 U    * 12/2013

* cited by examiner

*Primary Examiner* — Harry Liu

(57) ABSTRACT

A system for global positioning system (GPS) location, impact, and temperature recorder for a transporting container is an apparatus which monitors the location and the conditions of the transporting container. The apparatus consists of a first housing and a second housing, mounted externally and internally to the transporting container, respectively. The first housing contains: a GPS module to monitor the location of the transporting container; a mobile communication module, to broadcast the readings the apparatus to an end user; a first chipset linking the electrical components together; and a plurality of external sensors monitor motion of the transporting container, as well as if the container has been tampered with. The second housing is linked to the first housing via a second chipset to the first chipset. A plurality of internal-environmental sensors located on the second housing monitors and transmits the internal conditions of the transporting container to the first chipset.

14 Claims, 14 Drawing Sheets

SYSTEM FOR GPS LOCATION, IMPACT, AND TEMPERATURE RECORDER FOR A TRANSPORTING CONTAINER

The current application claims a priority to the U.S. Provisional Patent application Ser. No. 61/924,826 filed on Jan. 8, 2014.

FIELD OF THE INVENTION

The present invention relates generally to shipment tracking systems. More specifically, the present invention is a tracking device and system for user monitoring of shipped packages and goods in transit.

BACKGROUND OF THE INVENTION

Currently, consumers and shippers are unable to monitor the ambient conditions and actual temperature of products in transit. This is very important for food safety. Closer monitoring of sensitive products is desirable for various reasons. Temperature sensitive goods are subject to fluctuations in product temperature during transit as well, which may spoil or damage the cargo being transported. Products are often transported en masse via ground vehicles such as trucks. Consumers and shippers may wish to more closely monitor products that are subject to temperature damage during transit. Additionally, shipping containers and vehicles are always subject to outside tampering, vandalism, or outright theft during transportation. In some cases, damage or theft is not discovered until vehicles have reached their destinations and the containers are examined or opened for removal of products. The present invention seeks to address the aforementioned issues as well as provide users with a functional, convenient, and practical solution for more closely monitoring products in transit.

The present invention is a tracking device and system for user monitoring of shipped packages, goods and other products in transit. In its preferred embodiment, the present invention comprises a tracker and a monitoring system. The tracker comprises an internal component and an external component. The internal component of the tracker comprises a device housing structure, a power supply or source, and a temperature sensor. The external component of the tracker comprises a weatherproof housing structure, a Global Positioning System (GPS) module, an antenna, a communications module, one or more sensors, and a control system. The internal component of the tracker is designed to be secured within a shipping container, compartment, or vehicle space containing packages and goods. Furthermore, the internal component of the tracker is designed to be able to have the external component positioned within the device housing structure of the internal component, such that these components are easily transported together. The external component is physically tethered to the internal component and is mounted on the exterior of the shipping container, compartment or vehicle space by clamping the device to the trailer. The external component may alternatively be wirelessly tethered to the internal component. The tracker provides information regarding the location, ambient conditions and temperature of the products. Additionally, the tracker is able to detect events such as shocks and impacts caused by sudden deceleration or stops. This tracker information is relayed to the monitoring system in real-time. Users may utilize the monitoring system to view current information drawn from the tracker. The monitoring system provides users with updates on an interval basis set by the users or when prompted by the users. The tracker is programmable through the monitoring system to set various triggers for alerts such as a temperature change threshold. The monitoring system is user accessible via various electronic platforms such as, but not limited to, computers, tablet computers, and mobile devices. The present invention strengthens the ability for shippers to be notified of possible contamination of products, damage or theft.

The object of the present invention is to provide a means for users to more closely monitor packages, goods and other products in transit. The tracker is accessible at any time for users to receive status updates. In addition to user prompted updates, updates are also provided on an interval and event trigger basis.

DETAIL DESCRIPTIONS OF THE INVENTION

All illustrations of the drawings are for the purpose of describing selected versions of the present invention and are not intended to limit the scope of the present invention.

The present invention is a system for global positioning system (GPS) location, impact, and temperature recorder for a transporting container to monitor the conditions and to track the transporting container during transit. The conditions of a transporting container may adversely affect sensitive products. For example, a refrigerated truck may not have the correct temperature set point where the set point is higher than the required temperature for product transportation or the refrigeration unit may break during transit. The product may spoil if issues such as these are not addressed in a timely manner. Therefore, it is an object of the present invention to provide a means for assessing the conditions of the product within a transporting container such that sensitive products are monitored in real-time.

Figure 1:
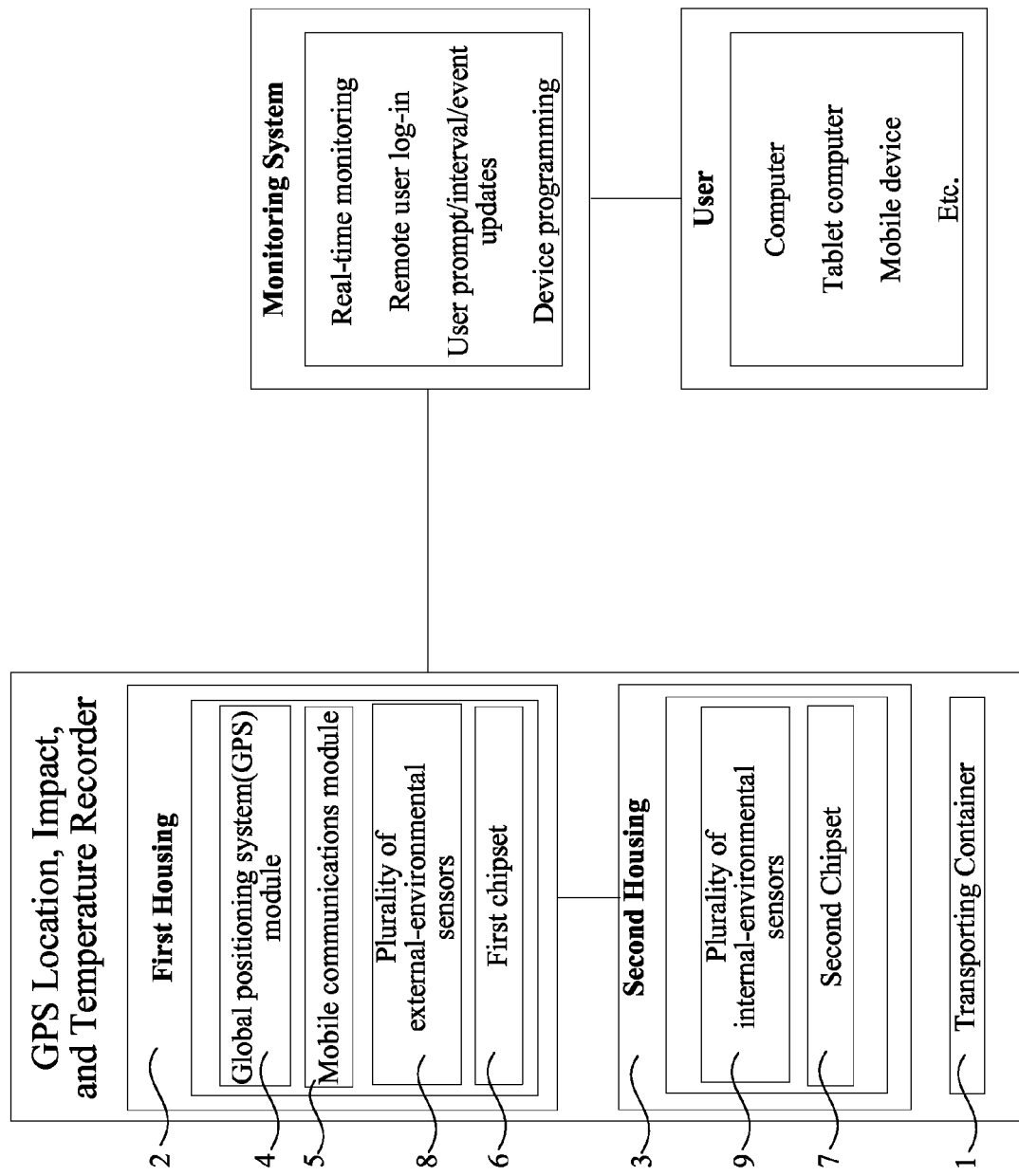
FIG. 1 is a diagram of the components and the application of the present invention.
Figure 9:
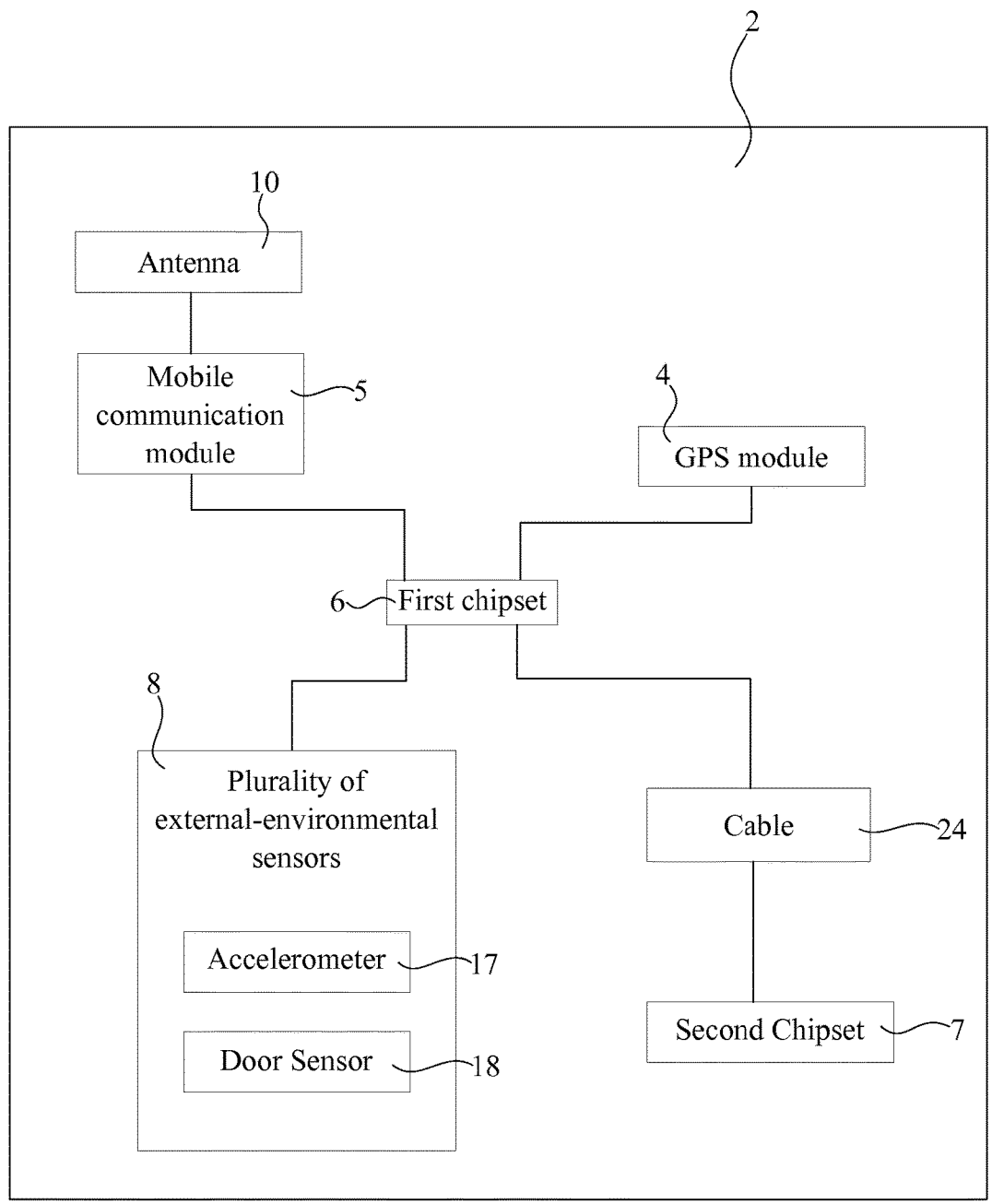
FIG. 9 is a schematic of the components positioned within the first housing in a wired embodiment.
Figure 10:
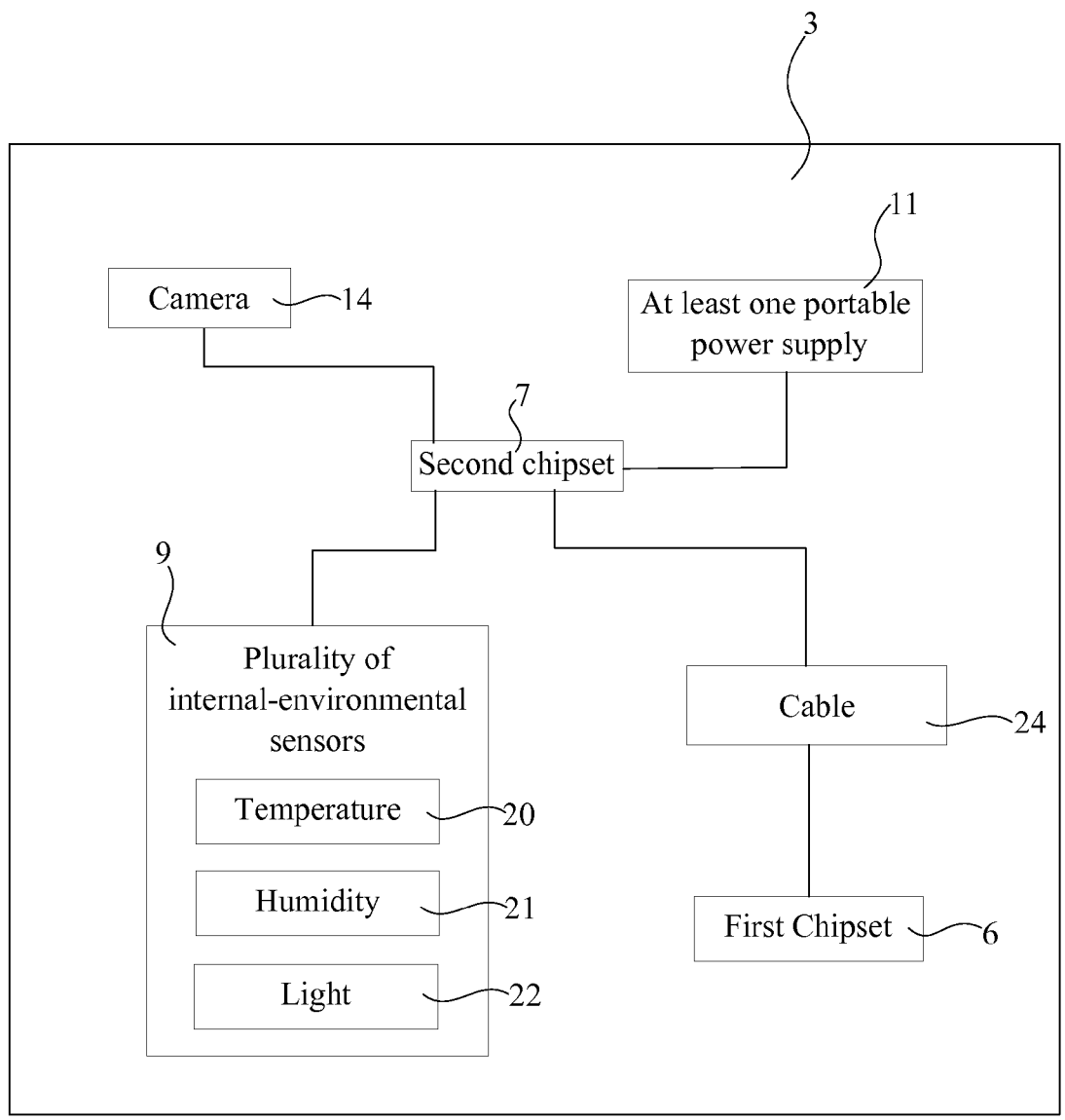
FIG. 10 is a schematic of the components positioned within the second housing in a wired embodiment.
Figure 11:
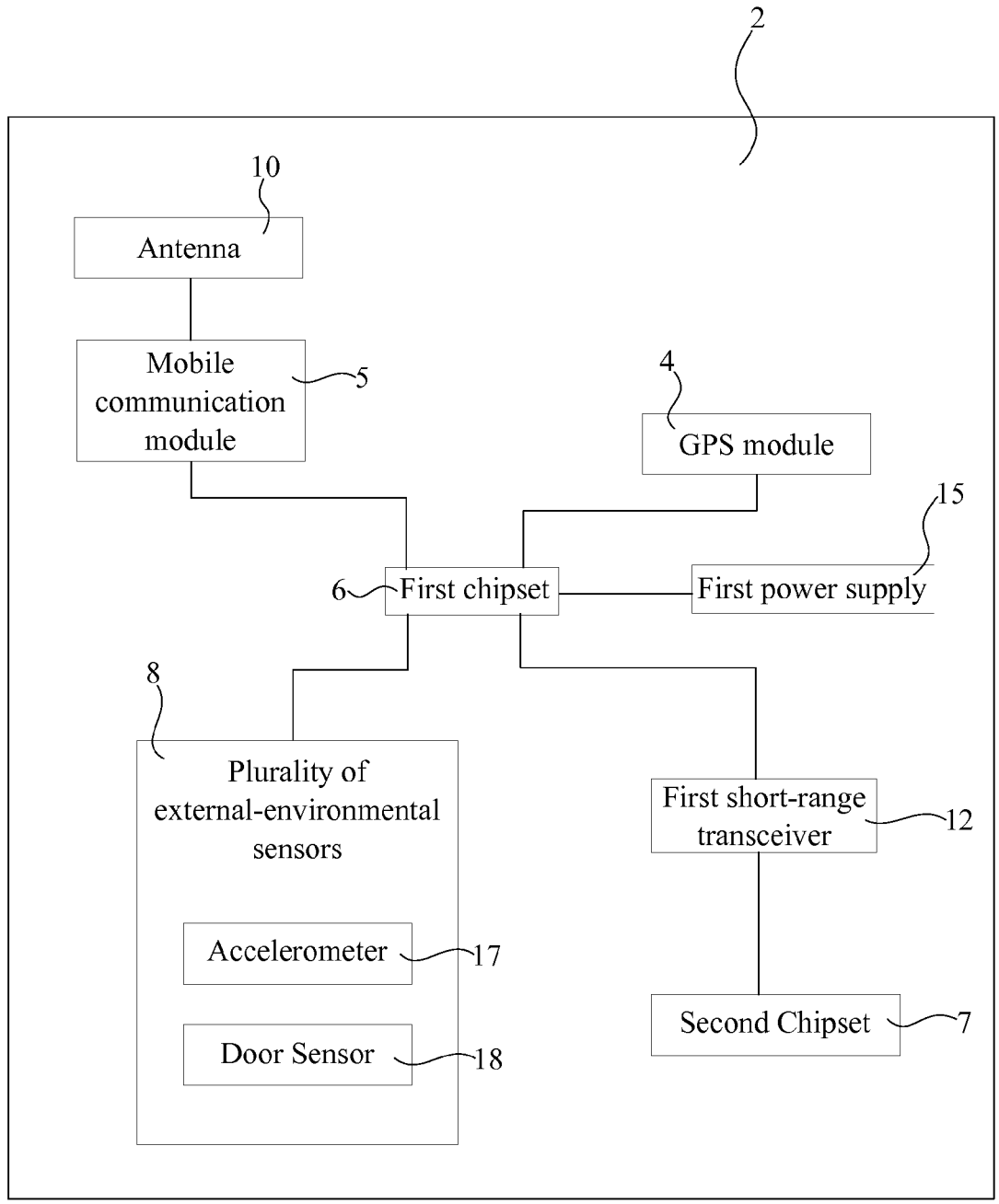
FIG. 11 is a schematic of the components positioned within the first housing in a wireless embodiment.
Figure 12:
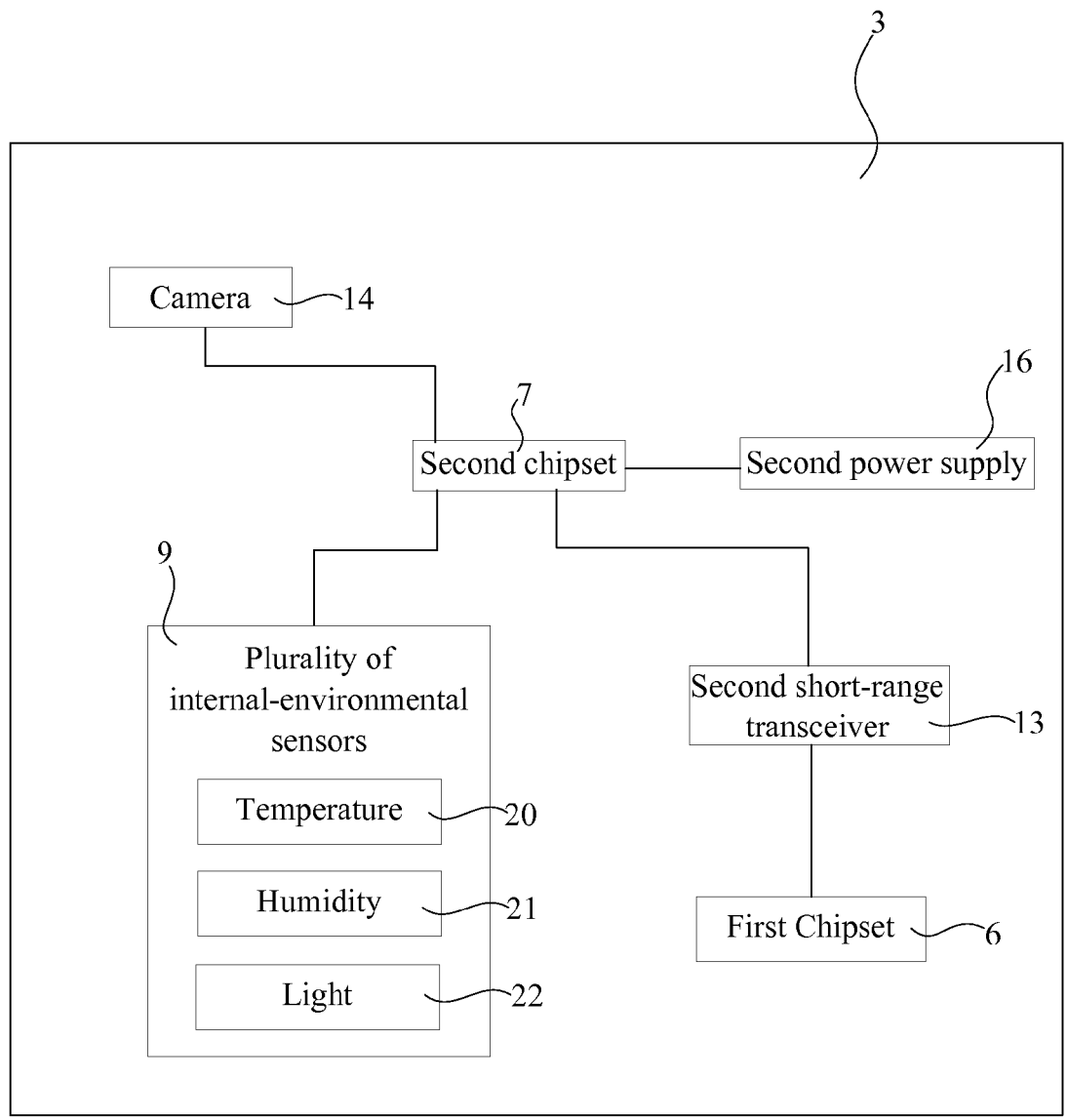
FIG. 12 is a schematic of the components positioned within the second housing in a wireless embodiment.

As depicted in FIG. 1, the system for GPS location, impact and temperature recorder for a transporting container comprises a transporting container 1, a first housing 2, a second housing 3, a GPS module 4, a mobile communication module 5, a first chipset 6, a second chipset 7, a plurality of external-environmental sensors 8, and a plurality of internal-environmental sensors 9. The transporting container 1 houses the products that need to be transported and maintains the environmental condition the product is to be stored. The first housing 2 is externally and adjacently mounted onto the transporting container 1, as show in FIG. 2 and FIG. 3. The GPS module 4, the mobile communication module 5, and the first chipset 6 are positioned within the first housing 2, as shown in FIG. 1, FIG. 9, and FIG. 11. The GPS module 4 provides real-time location tracking. The mobile communications module 5 allows the present invention to communicate with remote computing devices such as a computer, smart phone, tablet or similar computing devices such that end users are able to view readings from the plurality of external-environmental sensors 8 and the plurality of internal environmental sensors 9. The GPS module 4 and the mobile communication module 5 are electronically connected to the first chipset 6, where the geographical location of the transporting container is continuously detected by the GPS module 4 so that the location can be shared through a mobile communication network. The second housing 3 is internally and adjacently mounted onto the transporting container 1, as shown in FIG. 3. The second chipset 7 is within the second housing 3, as shown in FIG. 1, FIG. 10, and FIG. 12. The second chipset 7 is communicatively coupled to the first chipset 6. Detailed in FIG. 9 to FIG. 12, the plurality of external-environmental sensors 8 is electronically connected to the first chipset 6 and the plurality of internal-environmental sensors 9 is electronically connected to the second chipset 7. The second housing 3 is large enough so that the first housing 2 is able to be stored within the second housing 3 for transportation of a single unit such that first housing and the second housing are not separated when not in use, as shown in FIG. 4.

Figure 4:
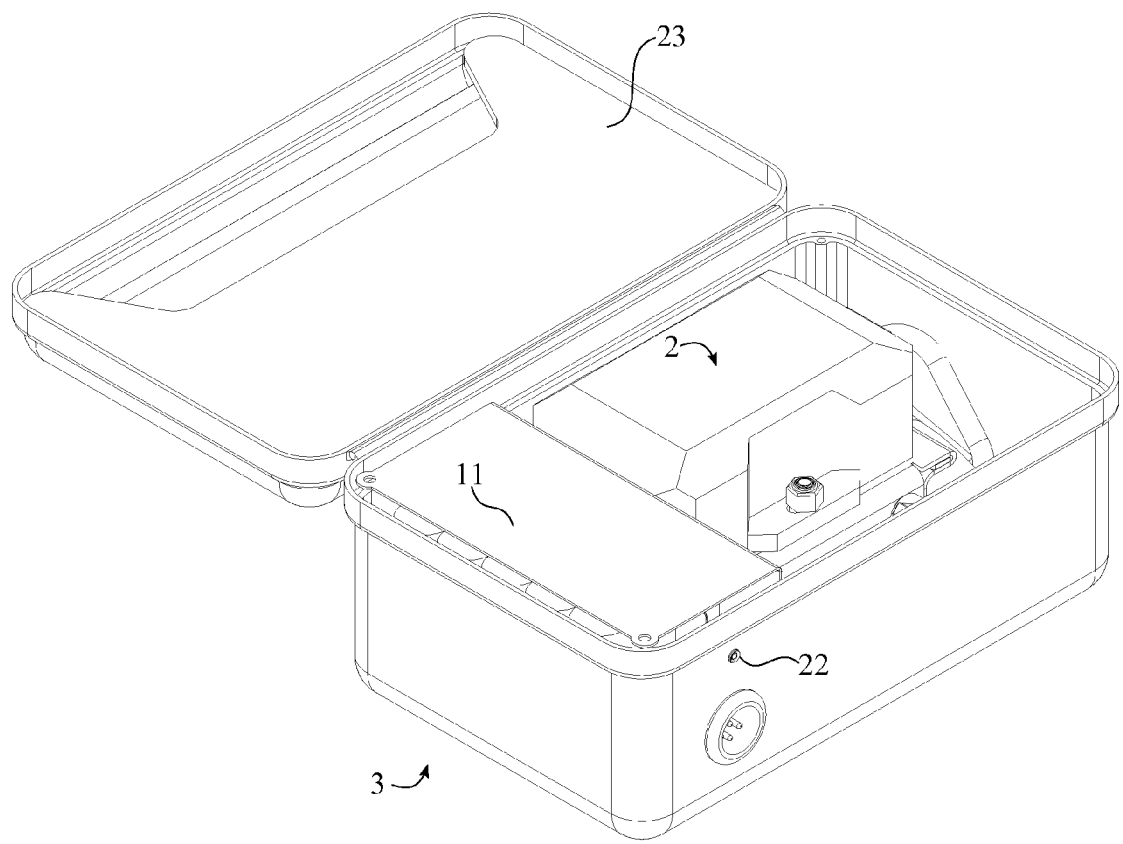
FIG. 4 is a perspective drawing of the present invention where the first housing is shown being stored within the second housing.
Figure 5:
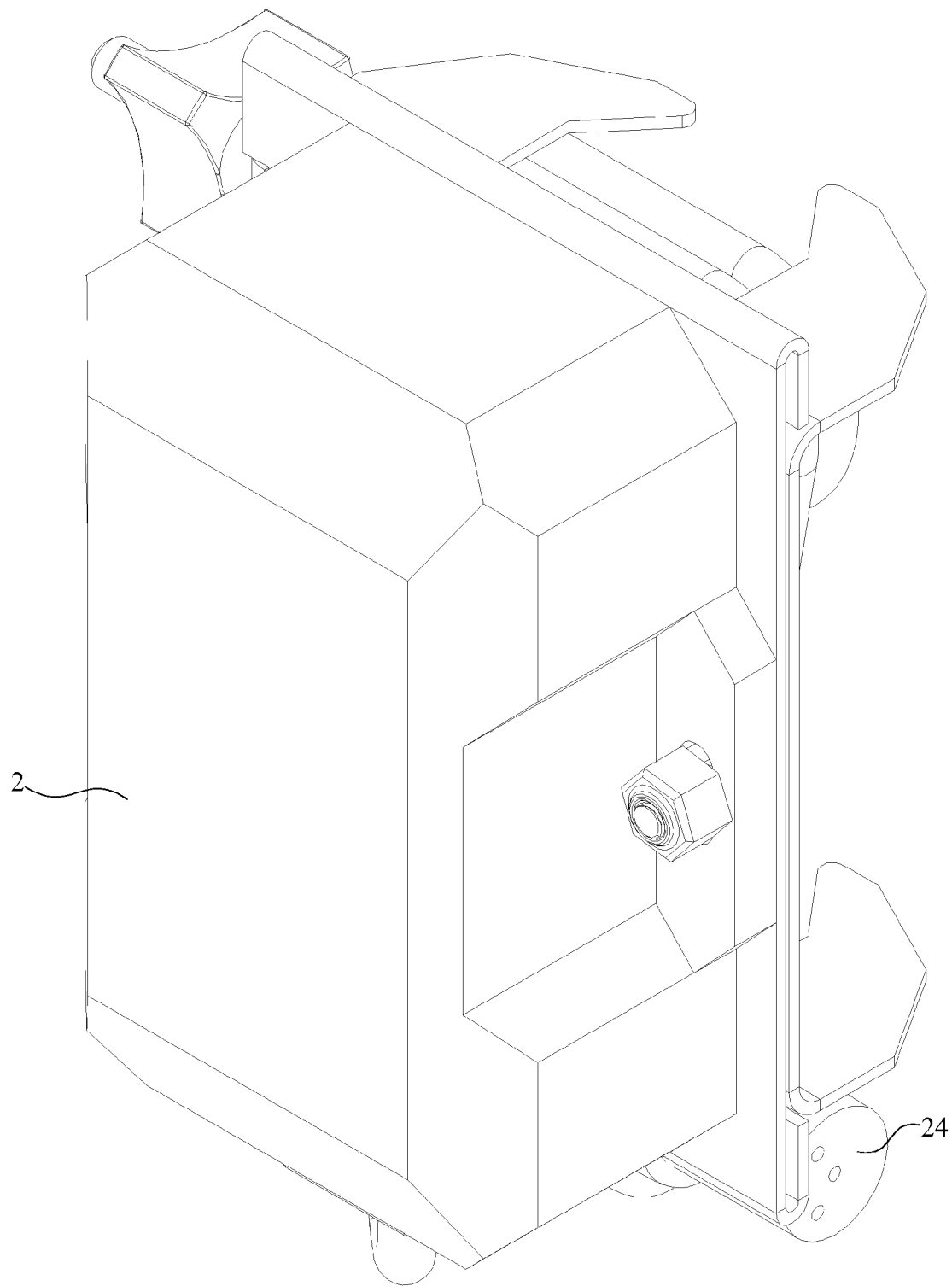
FIG. 5 is a perspective view of the first housing of the present invention.

In the preferred embodiment, the present invention comprises at least one portable power supply 11, which is electrically connected to the first chipset 6 and second chipset 7. In accordance to FIG. 4 and FIG. 6, the at least one portable power supply 11 is positioned within the second housing 3, in order to directly power the second chipset 7 and subsequently the plurality of internal-environmental sensors 9. The first chipset 6 and the plurality of external-environmental sensors 8 are indirectly powered by the at least one power supply 11 through a weatherproof cable 24 as the weatherproof cable 24 electrically connects the second chipset 7 to the first chipset 6. The weatherproof cable 24 traverses from the first housing 2, through the transporting container 1, to the second housing 3, as shown in FIG. 3, and is able to be wrapped up behind the first housing 2 for storage, as depicted in FIG. 5.

In an alternate embodiment, the at least one portable power supply 11 comprises a first power supply 15 and a second power supply 16. In accordance to FIG. 11 and FIG. 12, the first power supply 15 is positioned within the first housing 2 and is electrically connected to the first chipset 6 to directly power the first chipset 6 and subsequently power the plurality of external-environmental sensors 8. Similarly, the second power supply 16 is positioned within the second housing 3 and electrically connected to the second chipset 7 providing direct power to the second chipset 7 and subsequently powers the plurality of internal-environmental sensors 9. The alternative embodiment allows for the present invention to communicate wirelessly between the first chipset 6 and the second chipset 7.

Further in accordance to FIG. 11 and FIG. 12, in the alternate embodiment of the present invention using wireless communication, the present invention further comprises a first short-range transceiver 12 and a second short-range transceiver 13. The first short-range receiver 12 is electronically connected to the first chipset 6 and positioned within the first housing 2. The second short-range receiver 13 is electronically connected to the second chipset 7 and positioned within the second housing 3. The first short-range transceiver 12 is communicably coupled to the second short-range transceiver 13, such that the readings from the plurality of internal sensors 9 can be transmitted over a mobile communication network to a remote end user to monitor the conditions within the transporting container 1.

Figure 2:
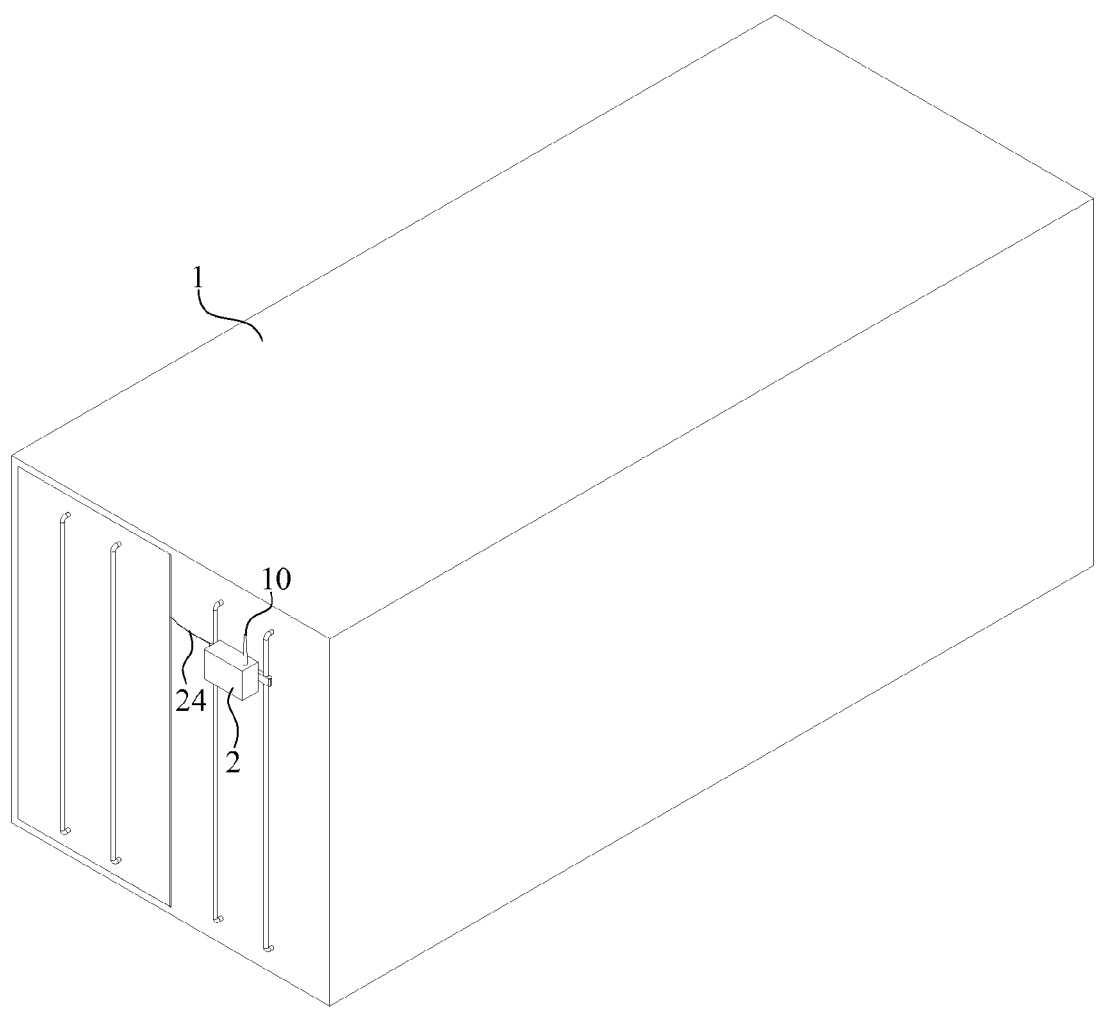
FIG. 2 is a perspective of the present invention externally mounted on a transporting container.
Figure 3:
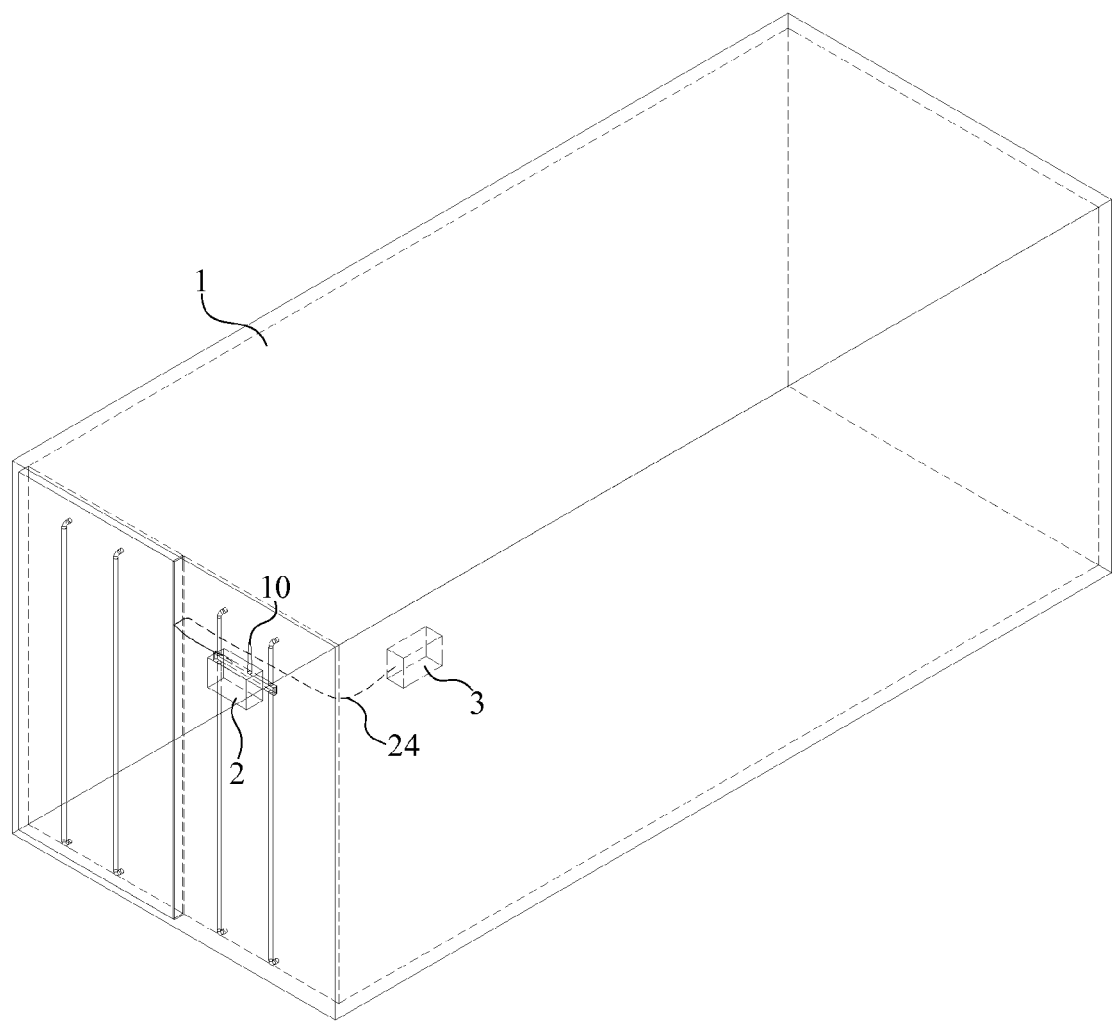
FIG. 3 is an internal view of the transporting container with the first housing and the second housing visible.

In order to keep constant communication with the mobile communication network, the preferred embodiment of the present invention includes an antenna 10 as shown in FIG. 2 and FIG. 3. The antenna 10 extends the range which the present invention is able to communicate with the mobile communication network. The antenna 10 is electronically connected to the mobile communication module 5. While it is preferred that the antenna 10 is adjacently mounted onto the first housing 2, the antenna can also be adjacently mounted onto the exterior of the transportation container 1.

The plurality of external-environmental sensors 8 comprises an accelerometer 17 and door sensor 18, as depicted in FIG. 9 and FIG. 11. The accelerometer 17 assesses and monitors the motion of the transporting container 1 in real time. The assessed readings helps the remote end user to assess if the transporting container 1 stops abruptly, accelerates too quickly, makes aggressive maneuvers, or traverses inclement road conditions. Assessing these motions helps the remote end user know if the cargo could possibly be damaged through shipping. The door sensor 18 allows for the present invention to monitor a door 19 of the transporting container 1 whether the container is opened or closed to prevent theft and other inventory loss, wherein the transporting container 1 comprises a door 19. The door sensor 18 is adjacently mounted to the door 19 such that the door sensor 18 can accurately assess the positioning of the door 19.

Figure 7:
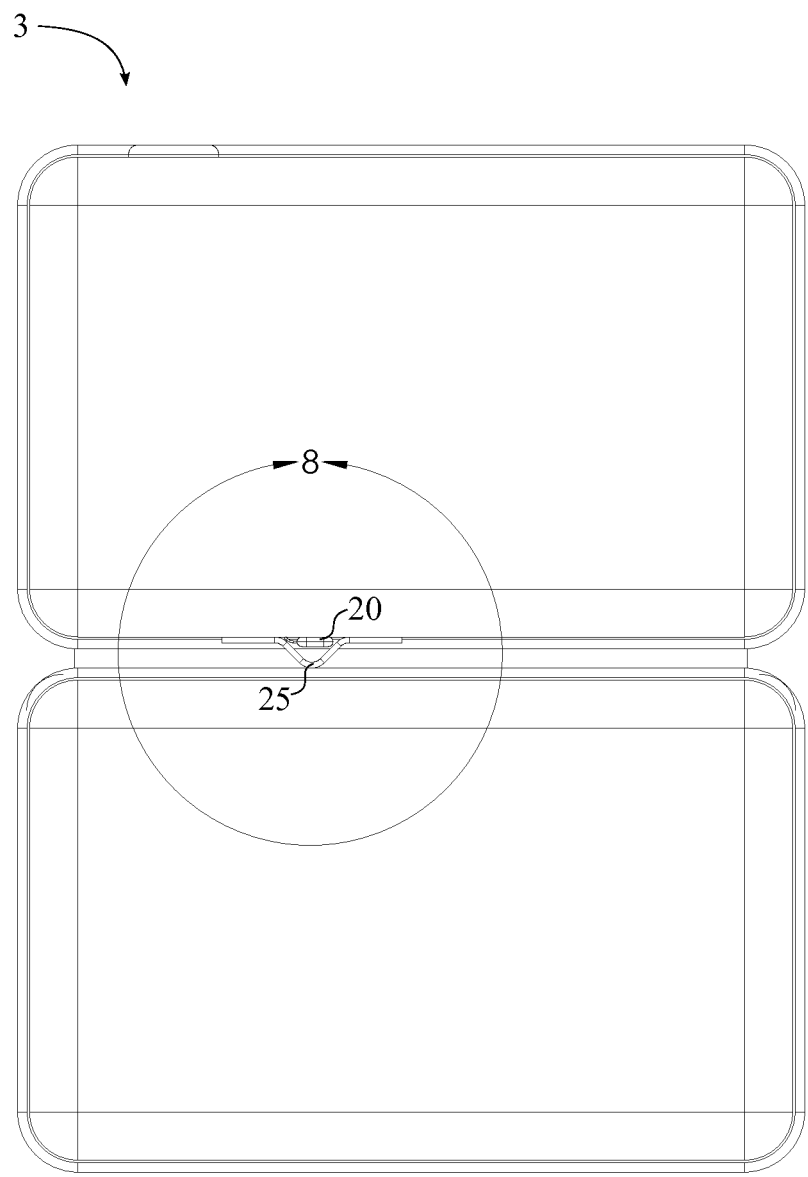
FIG. 7 is a bottom view of the second housing of the present invention.
Figure 8:
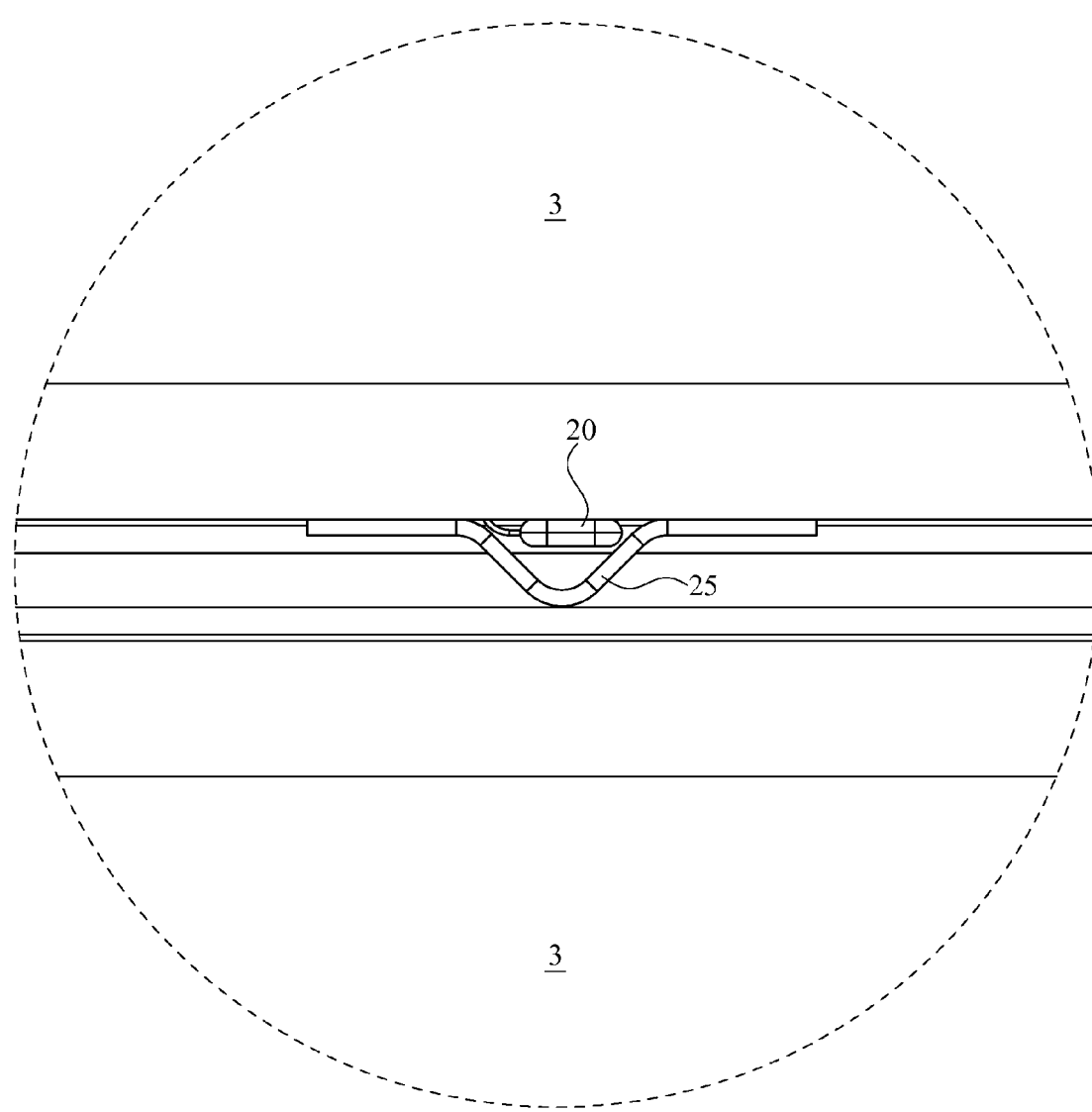
FIG. 8 is a detailed view of temperature sensor as it is mounted on the present invention shown in FIG. 7.

The plurality of internal-environmental sensors 9 comprises a temperature sensor 20, a humidity sensor 21, and a light sensor 22, in accordance to FIG. 10 and FIG. 12. The temperature sensor 20 assesses the temperature of the interior of the transporting container 1, as well as the products being shipped, to be reported to a remote end user. Further in accordance to the preferred embodiment, the present invention comprises a temperature sensor cover 25, detailed in FIG. 7 and FIG. 8. The temperature sensor cover 25 protects the the temperature sensor 20 from being damaged as well as reducing false readings by reducing convection around the temperature sensor 20. The end user can determine or be alerted if the temperature is exceeds the range in comparison to the preferred or predetermined storage temperature. The humidity sensor 21 assesses how much water vapor is detected within the interior of the transporting container 1, which may be damaging to certain products and goods. The light sensor 22 assesses the amount of light present within the transporting container. The light sensor 22 can act as a redundant or stand alone door sensor 18, such that when the door 19 is opened and light is introduced into the interior of the transportation container 1 the light sensor 22 would be triggered. The temperature sensor 20, the humidity sensor 21, and the light sensor 22 are adjacently mounted onto the second housing 3, such that they are positioned to measure the separate conditions of the interior of the transporting container 1.

In an alternate embodiment of the present invention, the temperature sensor 20 comprises a temperature probe. The temperature probe assesses the temperature of sample products within the interior of the transporting container 1. The temperature probe is electronically connected to the second chipset 7 and traverses from the second housing 3. A distal end of the temperature probe is inserted into a sample product to assess the actual temperature, transmitting the reading to an end user through the wireless communications module 5.

In accordance to the preferred embodiment, the present invention further comprises a camera 14, as presented in FIG. 10 and FIG. 12. The camera 14 is adjacently connected to the second chipset 7 and pivotably mounted to the second housing 3. The camera 14 is capable of recording video or taking still photographs. When the door sensor 18 or light sensor 22 is triggered a signal may be transmitted to the camera 14 to begin recording or to take pictures, such that a thief would be more easily identified when they open the door 19 to retrieve the products and goods within the transporting container 1.

The first housing 2 and the second housing 3 are made from a durable material, such that the first housing 2 is resistant from most weather conditions and the second housing 3 is able to withstand heavy abuse from shifting or falling cargo, goods, and other products stored within the interior of the transporting container 1.

In the preferred embodiment, where the transporting container 1 is a cargo trailer for a semi-trailer truck, one embodiment of the present invention comprises a locking bar mount. The locking bar mount engages a pair of locking bars on the exterior of the cargo trailer. The first housing 2 is mounted onto the locking bar mount.

Figure 13:
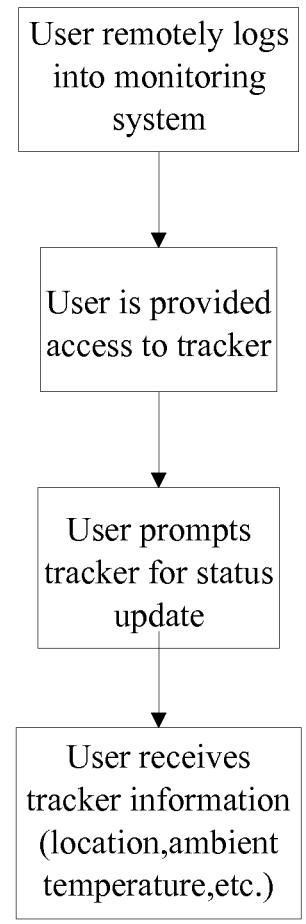
FIG. 13 is an example of status update information along with current and previous alerts.
Figure 14:
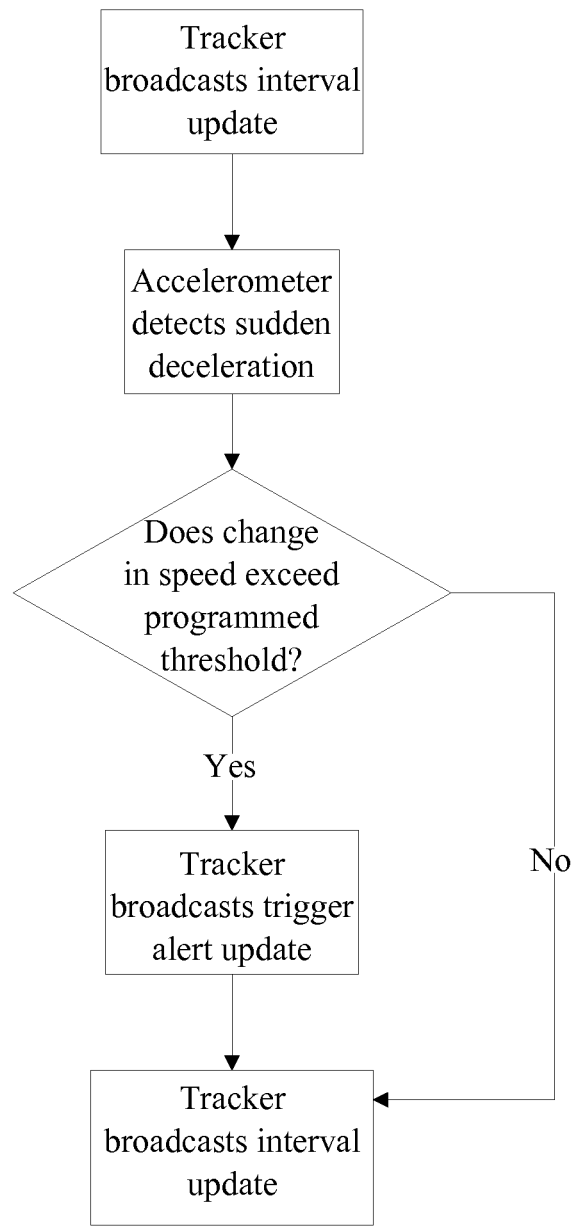
FIG. 14 is a flowchart depicting exemplary system actions in a trigger alert update sequence caused by a sudden deceleration.

In accordance to FIG. 13, users are able to remotely access the present invention through a monitoring system using a personal computer, a laptop, a tablet, a smartphone, or similar computing devices. Users are able to: monitor the results from the aforementioned plurality of external-environmental sensors 8 and the plurality of internal-environmental sensors 9; monitor the location of the transporting container 1; view triggered alerts; and adjust update intervals and sensor set points. Triggered alerts occur when a sensor reads values outside of the set point. These triggered alerts are transmitted to the remote end user over the mobile communication network, such that they may be able to take appropriate actions according to the alert they receive. One such triggered alert is exemplified in FIG. 14. For example when the accelerometer 17 detects a sudden stop that exceeds the preprogrammed threshold, an alert is sent through the mobile communication module 5 detailing how the transporting container 1 decelerated. If no such trigger is detected, the present invention continues to transmit updates at a predetermined interval.

Figure 6:
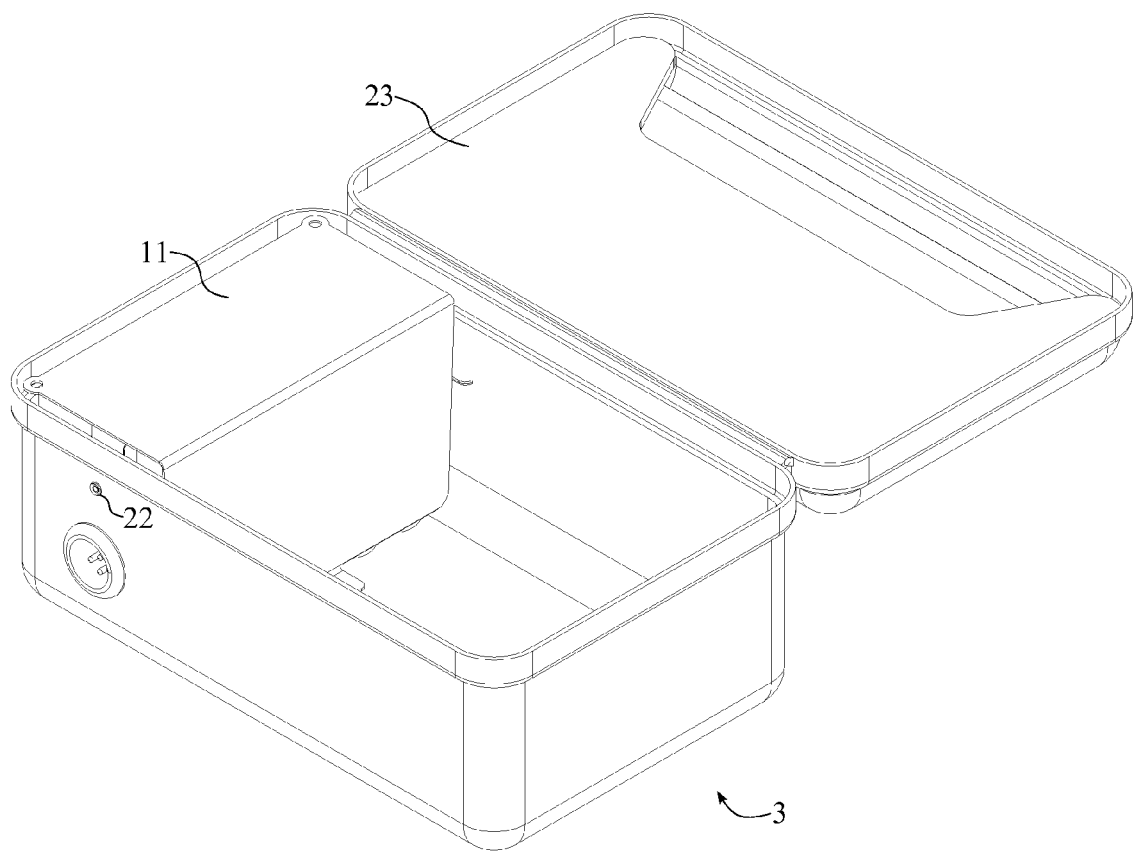
FIG. 6 is a perspective view of the second housing of the present invention.

Since the present invention has numerous shipping applications, the preferred embodiment of the present invention comprises a document storage compartment 23, detailed in FIG. 4 and FIG. 6. The document storage compartment 23 allows for shipping and packaging information to be stored within the present invention, such that it would not get lost or misplaced during transit. The document storage compartment 23 is positioned and mounted within the second housing 3.

Although the invention has been explained in relation to its preferred embodiment, it is to be understood that many other possible modifications and variations can be made without departing from the spirit and scope of the invention as hereinafter claimed.

What is claimed is:
1. A system for GPS location, impact, and temperature recorder for a transporting container comprises:
   a transporting container;
   a first housing;
   a second housing;
   a global positioning system (GPS) module;
   a mobile communications module;
   a first chipset;
   a second chipset;
   a plurality of internal-environment sensors;
   a plurality of external-environment sensors;
   the first housing being externally mounted onto the transporting container;
   the second housing being internally mounted onto the transporting container;
   the GPS module, the mobile communications device, and the first chipset being positioned within the first housing;
   the GPS module and the mobile communications module being electronically connected to the first chipset;
   the second chipset and the at least one power supply being positioned within the second housing;
   the second chipset being communicatively coupled to the first chipset;
   the plurality of external-environmental sensors being electronically connected to the first chipset; and
   the plurality of internal-environmental sensors being electronically connected to the second chipset.
2. The system for GPS location, impact, and temperature recorder for a transporting container, as claimed claim 1, comprises:
   an antenna; and
   the antenna being electronically connected to the mobile communication module.
3. The system for GPS location, impact, and temperature recorder for a transporting container, as claimed claim 2, comprises:
   the antenna being adjacently mounted onto the first housing.
4. The system for GPS location, impact, and temperature recorder for a transporting container, as claimed claim 2, comprises:
   the antenna being adjacently mounted onto the transporting container.
5. The system for GPS location, impact, and temperature recorder for a transporting container, as claimed claim 1, comprises:
   at least one portable power supply; and
   the at least one power supply being electrically connected to the first chipset and the second chipset.
6. The system for GPS location, impact, and temperature recorder for a transporting container, as claimed claim 1, comprises:
   at least one power supply;
   the at least one power supply comprises the first power supply and a second power supply;
   the first power supply being positioned within the first housing;
   the first power supply being electrically connected to the first chipset;
   the second power supply being positioned within the second housing; and the second power supply being electrically connected to the second chipset.

7. The system for GPS location, impact, and temperature recorder for a transporting container, as claimed claim 1, comprises:
the second chipset being electronically connected to the first chipset through a weatherproof cable; and
the weatherproof cable traversing from the first housing, through the transporting container, and to the second housing.

8. The system for GPS location, impact, and temperature recorder for a transporting container, as claimed claim 1, comprises:
a first short-range transceiver;
a second short-range transceiver;
the first short-range transceiver being electronically connected to first chipset;
the first short-range transceiver being positioned within the first housing;
the second short-range transceiver being electronically connected to second chipset;
the second short-range transceiver being positioned within the second housing; and
the first short-range transceiver being communicably coupled to the second short-range transceiver.

9. The system for GPS location, impact, and temperature recorder for a transporting container, as claimed claim 1, comprises:
the plurality of external-environmental sensors comprises an accelerometer; and
the accelerometer being mounted within the first housing.

10. The system for GPS location, impact, and temperature recorder for a transporting container, as claimed claim 1, comprises:
the transporting container comprises a door;
the plurality of external-environmental sensors comprises a door sensor; and
the door sensor being adjacently mounted onto the door.

11. The system for GPS location, impact, and temperature recorder for a transporting container, as claimed claim 1, comprises:
the plurality of internal-environment sensors comprises a temperature sensor; and
the temperature sensors being adjacently mounted onto the second housing.

12. The system for GPS location, impact, and temperature recorder for a transporting container, as claimed claim 1, comprises:
the plurality of internal-environment sensors comprises a humidity sensor; and
the humidity sensors being adjacently mounted onto the second housing.

13. The system for GPS location, impact, and temperature recorder for a transporting container, as claimed claim 1, comprises:
the plurality of internal-environment sensors comprises a light sensor; and
the light sensors being adjacently mounted onto the second housing.

14. The system for GPS location, impact, and temperature recorder for a transporting container, as claimed claim 1, comprises:
a camera;
the camera electronically connected to the second chipset; and
the camera being adjacently and pivotably mounted onto the second housing.

\* \* \* \* \*